United States Patent

[11] 3,599,513

[72] Inventors David G. Buno
6820 4th Ave., Rio Linda, Calif. 95673;
General C. Fletcher, 3630 Way Country
Club, Sacramento, Calif. 95821
[21] Appl. No. 858,448
[22] Filed Sept. 16, 1969
[45] Patented Aug. 17, 1971

[54] VACUUM REGULATOR FOR ENGINE
AUTOMATIC TRANSMISSION
4 Claims, 3 Drawing Figs.
[52] U.S. Cl. .................................................. 74/877,
74/863
[51] Int. Cl. ...................................................... B60k 13/02
[50] Field of Search........................................... 74/877,
863, 864, 853

[56] References Cited
UNITED STATES PATENTS
2,588,140  3/1952  McFarland et al............  74/864
2,938,403  5/1960  Harrison et al. ..............  74/863
3,195,368  7/1965  Boudewijn.....................  74/863
3,500,705  3/1970  Forster..........................  74/863
2,551,287  5/1957  Price ............................  74/853

Primary Examiner—C. J. Husar
Attorney—Lothrop & West

ABSTRACT: A predetermined amount of air at substantially atmospheric pressure is bled into the vacuum line connecting the engine intake manifold and the automatic transmission of a vehicle engine in order to reduce the transmission line vacuum and thereby compensate for many types of slips in transmission members, exemplary being the slips resulting from "varnished" or "glazed" clutch plates and bands. The corrective airflow is controlled by a valve operatively connected to the engine throttle, with valve movement arranged to be a function of throttle position.

PATENTED AUG 17 1971

3,599,513

DAVID G. BUNO
GENERAL C. FLETCHER
INVENTORS

BY *Lothrop & West*

ATTORNEYS

VACUUM REGULATOR FOR ENGINE AUTOMATIC TRANSMISSION

The invention relates to apparatus for improving the performance of automatic transmissions, especially those automatic transmissions which are utilized in motor vehicles and which have been in use for protracted periods of time.

As is well known, the smoothness and consistency of operation of vehicle automatic transmissions tends to fall off after several years of operation. Among the reasons for this deterioration in performance is the tendency of the transmission clutches and bands to become "glazed" by a hard film of "varnish" believed to result from the deposition of impurities or other substances in the transmission fluid. As a result of the "glaze" the transmission components slip and frequently engage in a jerky, uneven and often noisy manner.

In other cases, transmission operation is too "soft" or "hesitant" as a consequence, perhaps, of improper settings of the spring-operated fluid control valve components relative to throttle position, engine load and vehicle speed.

It is therefore an object of the invention to provide a vacuum regulator for the automatic transmission of an engine which in many cases will improve the performance of the transmission and thereby avoid expensive transmission overhauls or replacements.

It is another object of the invention to provide a vacuum regulator which largely overcomes the rough and uneven performance of an automatic transmission resulting from glazed clutches and bands.

It is a further object of the invention to provide a vacuum regulator which makes a transmission shift at higher speeds than otherwise and which affords a "firm" or "solid" shift, yet one which is not abrupt.

It is another object of the invention to provide a which is very economical to install and use, yet which is long-lived, rugged, durable and reliable in operation.

It is another object of the invention to provide a vacuum regulator which ordinarily is operated in conjunction with a foot throttle (gas pedal), but which also affords manual control capabilities, so that the driver can, if desired, downshift the transmission at any desired speed, such as when going downgrade against compression.

It is another object of the invention to provide a generally improved vacuum regulator for vehicle engine automatic transmissions.

Other objects, together with the foregoing, are attained in the embodiment described in the following description and illustrated in the accompanying drawing, in which.

Figure 1:
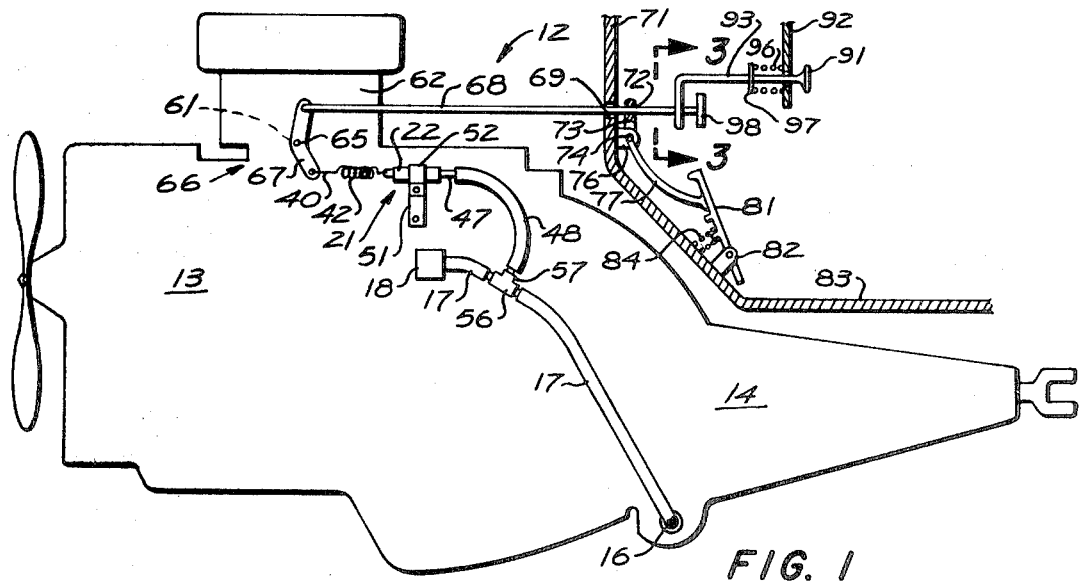
FIG. 1 is a side elevational view showing the regulator installed in a typical environment, namely on a vehicle engine provided with an automatic transmission, the engine and transmission housing being shown in outline.

As is well known, many automatic transmissions include a torque converter which operates in conjunction with a gear train, often of the planetary variety. The components of the gear train are selectively brought into operation by the action of fluid pressure on various clutches and bands (brakes). For the most part, the clutches and bands are actuated by pistons or plungers, which are spring biased against the forces exerted by the transmission fluid; and appropriate fluid flow direction is afforded by suitable valving acting independence upon such factors as car speed and the engine torque signals, influenced by throttle openings.

Most automatic transmissions are either of the type wherein shifting is effected by direct change in operating fluid pressure or by change in shift control pressure. In either case, the effective pressure is governed by a widely used device known as a "vacuum modulator." The vacuum modulator is interposed in the transmission vacuum line extending from the intake manifold to the transmission proper.

Whereas the car speed signal to the transmission is governor pressure (regulated from drive oil pressure), engine vacuum is an indicator of carburetor (throttle) opening and engine torque attitude. This signal (vacuum) moves the vacuum modulator diaphragm assembly which, in turn, actuates the modulator valve to regulate line pressure into modulator pressure. High vacuum (low-torque signal) results in low modulator pressure; low vacuum (high-torque signal) results in high modulator pressure.

When a transmission is new or relatively new, and the clutches and bands are not "glazed," a high-vacuum signal (with the attendant low modulator pressure) creates no particular problem since the coefficients off friction of the engaging members are substantial. In fact, the low pressure affords a very smooth engagement of the components, and a consequent smooth shift.

After the clutches and bands become "varnished," however, a high-vacuum signal results in inadequate fluid operating pressure. As a consequence, shifting is erratic, jerky and often noisy. At other times, slipping occurs and the shift is soft or hesitant.

By reducing the extent of the high-vacuum signal, the modulator pressure is increased and many of the symptoms of poor transmission performance are eliminated.

We are quite aware of the fact that the installation of our vacuum regulator does not "cure" the basic problem, but it has been found to be very effective in improving transmission performance for a considerable length of time, thereby obviating for a period the need for expensive overhauls or replacements.

While the vacuum regulator of the invention is susceptible of numerous physical embodiments, depending upon the environment and requirements of use, substantial numbers of the herein shown and described embodiment have been made and tested, and all have performed in an eminently satisfactory manner.

The regulator of the invention, generally designated by the reference numeral 12 is customarily used in conjunction with an internal combustion engine 13 provided with an automatic transmission 14.

Most automatic transmissions include a vacuum modulator 16 preferably located at some convenient position on the transmission housing. Vacuum modulators have long been known and used, and a detailed description of their construction and mode of operation is therefore considered unnecessary.

Connected to most vacuum modulators is a transmission vacuum line 17 leading from a fitting 18 connected to a vacuum source, such as the vehicle engine's intake manifold (not shown).

Included in the vacuum regulator of the invention 12 is a regulator valve 21 comprising an elongated tubular housing 22 closed at its forward end by an a... ular plug 23 suitably attached to the interior wall of the tubing, as by an epoxy type of adhesive, and closed at its after end by a transverse closure wall 24. The tubular walls of the housing, together with the forward plug 23 and the after closure wall 24 define a cent.. 1 chamber 26 in communication with the atmosphere, as by an opening 27 in the tube wall.

The forward end of the afterwall 24 is conically recessed to serve as a valve seat 31 arranged to receive in substantially airtight relation the face 32 of a valve head 33 mounted on the end of a valve stem 34 extending axially through a very loosely confining bore 36 in the forward plug 23. The forward portion 37 of the valve stem projects forwardly from the plug 23 and is provided with an opening 38 to receive a hook 39 on the afterwire pigtail 41 of a tension spring 42 having a strength, for example, of 5 pounds.

Figure 2:
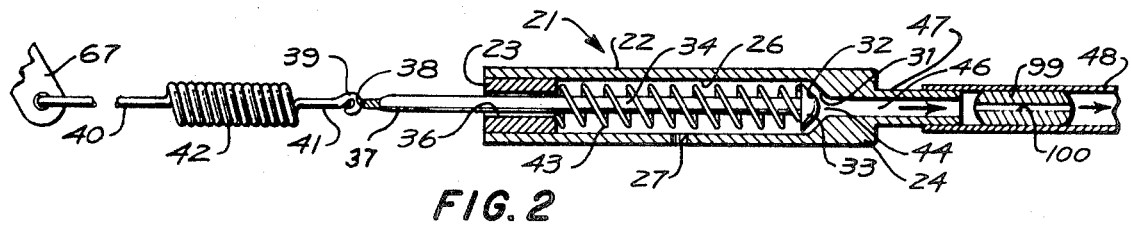
FIG. 2 is a fragmentary, median, vertical, longitudinal, sectional view, to an enlarged scale, of the regulator valve; and, FIG. 3 is a fragmentary sectional view, to an enlarged scale, of the manual control device, the plane of the section being indicated by the line 3-3 in FIG. 1.

The valve stem 34 is biased in a right-hand direction (see FIG. 2) by a compression spring 43 interposed between the plug 23 and the valve head 33. The compression spring 43, having a strength of about 2 pounds, tends to urge the valve face 32 against the valve seat 31 and thereby prevent the flow of atmospheric air from the air chamber 26 through the outlet port 44 thence outwardly through the passageway 46 extending through a nipple 47 connected to a conduit 48, or hose, extending to the transmission vacuum line 17 (see FIG. 1).

Owing to the fact that the vacuum regulator of the invention is ordinarily installed after the transmission has been in service for a considerable length of time, the device is conveniently mounted at any appropriate location and is connected to existing equipment. For example, as appears most clearly in FIG. 1, the valve 21 is mounted on the side of the engine 13 by a metal strap 51 having a loop 52 encompassing the tubular valve housing. The loop 52 is cinched by an appropriate fastener and the strap 51 is similarly secured.

The conduit 48 is connected to the transmission vacuum line 17 by severing the line 17 and inserting therein the two opposed legs of a T-fitting 56, the riser 57 of the T-fitting being connected to the hose 48 extending from the regulator valve 21, as previously described.

The amount of atmospheric air bled into the transmission vacuum line 17 is dependent upon the position of the throttle device 61 located in the carburetor 62.

The throttle 61, in turn, is positioned by a throttle-responsive mechanism, generally designated by the reference numeral 66, including an operating member 67, such as a bellcrank, swivelly connected to an operating rod 68 extending rearwardly through an opening 69 in the firewall 71 and pivotally connected at 72 to the end of an upright finger 73 radially mounted on a transverse shaft 74 journaled in a spaced pair of brackets 76 mounted on the afterface of the firewall 71.

Rotation of the transverse shaft 74 is effected by an arcuate rod 77 mounted on one end of the shaft and extending downwardly and rearwardly into face-to-face, sliding engagement with the forward surface of the accelerator (gas pedal) 81 pivotally mounted on the brackets 82 secured to the floorboard 83. A compression spring 84 biases the pedal toward the driver's foot (not shown).

It can therefore be seen that as the driver's foot depresses the pedal, the linkage just described is effective to rock the bellcrank 67 in a clockwise direction about the pivot 65, this direction of motion corresponding to an open throttle 61.

Simultaneously, clockwise movement of the bellcrank 67 tends to stretch the forward tension spring 42 connected thereto by the forward pigtail 40. Stretching movement of the forward tension spring 42 is opposed by the force of the after-compression spring 43 tending to bias the valve into closed position. Since the forward spring 42 is the stronger of the two, however, the after spring 43 yields and the valve opens, thereby allowing atmospheric air from the valve chamber 26 to flow through the outlet port 44, through the hose 48 and on into the transmission vacuum line 17.

As a result of bleeding atmospheric air into the vacuum line 17, the extent of the "vacuum" therein is lessened. In other words, the substantial subatmospheric pressure within the vacuum line is raised so that the resultant pressure is more nearly atmospheric than it was before the air was bled into the vacuum line. By so reducing the "vacuum" the modulator pressure is higher as previously explained, so that a smoother operation of the transmission is effected.

The extent of dilution of the "vacuum" is, furthermore, a function of the throttle position since the greater the throttle opening the wider the opening of the regulator valve 21. The regulation, in other words, is dependent upon throttle position in a direct relation.

Figure 3:
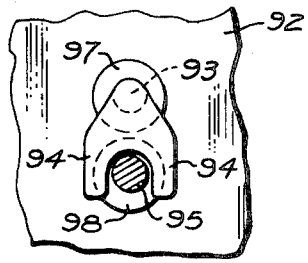

Manual operation of the throttle-responsive mechanism is afforded by a knob 91 located on the dashboard 92, the knob being connected to a forwardly extending pull rod 93 terminating in a downturned pair of forks 94 (see FIG. 3) straddling an after extension 95 of the operating rod 68. The fork 94 is biased forwardly by a compression spring 96 interposed between the dashboard 92 and a transverse washer 97 mounted on the pull rod 93. As the knob 91 is grasped and pulled away from the dashboard 92, the pull rod 93 is translated rearwardly until the fork 94 traverses the distance to a transverse plate 98 mounted on the after end of the rod extension 95. After this lost motion distance is covered, further rearward movement of the knob 91 is effective to translate the operating rod 68 in a rearward direction, thereby rocking the bellcrank 67 in a clockwise direction and opening the throttle 61, as before.

As will be appreciated, the lost motion feature just described allows manual operation to take place substantially independently of the movement of the foot pedal 81.

In installing the device, it has been found that in some instances it is desirable to constrict the flow of air through the hose 48 and in these cases an insert member 99 (see FIG. 2) having a passageway 100 with a predetermined diameter is preferably used. If necessary, two or three or more insert members, each having different passageway dimensions, can successively be installed and tested. The insert providing optimum performance is permanently installed in the hose 48, as shown, and therefore affords reliably good results.

It can therefore be seen that we have provided a compact, durable and economical device yet one which is flexible and efficient in improving the performance of older automatic transmissions.

What we claim is:

1. A vacuum regulator for engine automatic transmission comprising:
   a. a conduit connected at one end to the automatic transmission vacuum line of an engine transmission;
   b. a valve including an elongated tubular housing having a central air chamber at substantially atmospheric pressure, said chamber being defined at its forward end by a plug having an axial bore and at its after end by a transverse closure wall having an outlet port connected to the other end of said conduit, a valve stem translatably disposed in said axial bore and extending from an after end adjacent said outlet port to a forward end protruding forwardly from said plug, a valve head on said after end of said stem and movable therewith between a first position covering said outlet port and a second position uncovering said outlet port, and compression spring means associated with said valve head for biasing said valve head from said second position toward said first position;
   c. a throttle-responsive mechanism including an operating member connected to the engine throttle for movement in dependence upon the position of said engine throttle; and,
   d. a tension spring interposed between and connected to said operating member and said forward end of said valve stem, the spring constant of said tension spring exceeding the spring constant of said compression spring, movement of said engine throttle in a throttle-opening direction being thereby effective to move said valve head from said first position toward said second position, said compression spring being effective to move said valve head from said second position toward said first position as said engine throttle moves in a throttle-closing direction.

2. A vacuum regulator as in claim 1 wherein one end of the transmission vacuum line is connected to a vacuum modulator on the engine transmission, and the other end of the transmission vacuum line is connected to the intake manifold of the engine.

3. A vacuum regulator as in claim 2 including manual means for controlling the movement of said engine throttle.

4. A vacuum regulator as in claim 1 including a conduit insert member formed with a passageway therethrough of predetermined dimension for limiting the extent of airflow from said air chamber through said conduit.